United States Patent [19]

Deminet

[11] 4,013,210

[45] Mar. 22, 1977

[54] METHOD OF DIFFUSION BONDING

[76] Inventor: Czeslaw Deminet, 26037 Marine View Drive S., Kent, Wash. 98031

[22] Filed: Sept. 26, 1974

[21] Appl. No.: 509,417

Related U.S. Application Data

[63] Continuation of Ser. No. 282,595, Aug. 21, 1972, abandoned.

[52] U.S. Cl. .............................. 228/106; 228/181; 228/193; 228/234; 228/221
[51] Int. Cl.[2] ....................................... B23K 19/00
[58] Field of Search ............... 29/471.1, 472.3, 488, 29/493, 494, 504; 228/193, 194, 195, 221, 234, 263, 106

[56] References Cited

UNITED STATES PATENTS

| | | | |
|---|---|---|---|
| 3,533,153 | 10/1970 | Melill et al. ........................ | 29/471.1 |
| 3,533,156 | 10/1970 | Klimmek et al. ............... | 228/193 X |
| 3,538,593 | 11/1970 | King et al. ...................... | 228/193 X |
| 3,552,898 | 1/1971 | Bird et al. ......................... | 29/504 X |
| 3,628,226 | 12/1971 | Nelson .......................... | 29/156.8 H |
| 3,633,267 | 1/1972 | Deminet et al. ..................... | 29/493 |

OTHER PUBLICATIONS

"Process for Diffusion Welding Ti-6A1-4V Alloy", Rehder et al., *Welding Journal*, May 1970, pp. 213s-218s.
"Determination of Optimum Diffusion Welding Temperatures for Ti-6A1-4V", Keller et al., IBID, pp. 219s-224s.
Clark "Vacuum Diffusion Joining of TI," *Welding Journal Research Supplement*, June 1959, pp. 251s-258s.
Garrett et al., *Broad Applications of Diffusion Bonding,* NASA CR 409, Mar. 1966, pp. 1, 62-65.
"Titanium & Titanium Alloys; Diffusion Welding" Len Griffing, Editor, *Welding Handbook*, 6 Ed., 1972, Am. Welding Soc., pp. 73.43-73.46.

*Primary Examiner*—Al Lawrence Smith
*Assistant Examiner*—K. J. Ramsey
*Attorney, Agent, or Firm*—Robert B. Hughes

[57] ABSTRACT

A method of making a composite diffusion bonded structure, comprising a honeycomb panel portion made up of a honeycomb core sandwiched between two face sheets, and a load carrying structural member bonded thereto. The honeycomb core, face sheets and structural member are preassembled in a vacuum furnace so as to permit exposure of the surfaces which are to be diffusion bonded. A vacuum is drawn and the assembly is heated to near diffusion bonding temperature with the bonding surfaces still exposed to the vacuum environment. Thereafter, the bonding surfaces are brought into contact with very moderate pressure, and are maintained at a temperature and pressure sufficient for diffusion bonding. The assembly is then cooled, with the result being a substantially unitary diffusion bonded structure.

9 Claims, 15 Drawing Figures

METHOD OF DIFFUSION BONDING

This is a continuation of application Ser. No. 282,595, filed Aug. 21, 1972, now abandoned.

BACKGROUND OF THE INVENTION

This invention relates to a method of making diffusion bonded structure.

In the past several decades, there have been substantial advances, particularly in the aerospace industry, in the manufacture of high performance structures (i.e. those structures having a high strength to weight ratio). The two general methods of joining structural components to make a composite structure are: (a) using fasteners, and (b) bonding.

The use of fasteners usually requires the forming of the holes in the structural components to be joined. However, not only do the fasteners themselves add weight, but the structure must be made somewhat larger to make up for the reduction of load carrying capacity because of the presence of the holes. Further, the drilling of holes in load carrying structure generally causes a concentration of stresses in the structure adjacent the hole, thus encouraging the growth of fatigue cracks in the structure.

For these reasons, there has been greater effort to eliminate the use of fasteners wherever possible and bond the components together (e.g. by adhesive bonding, brazing, welding, diffusion bonding, etc.). However, attempts to bond larger or more complex structural components run into various technical problems, such as obtaining proper engagement of the bonding surfaces, proper distribution of the bond material, applying adequate heat and/or pressure at the bond areas, preventing warping of the structure by application of heat, preventing embrittlement of the structure being bonded, etc.

In some applications, such as in supersonic aircraft, this general problem area has been further complicated because of the necessity of the structure withstanding sustained higher temperatures, in the order of perhaps 500° F. or more. Since most organic adhesives will not stand up under such temperatures, the use of braze metals to join components together appears to offer a more attractive alternative. However, the use of such braze metals presents problems of its own. If the braze metal in the structural assembly is maintained at a melting temperature for too long a period, the braze metal may tend to flow away from the braze area. Also, there is a tendency for the braze metal to dissolve into the metal to form an embrittled alloy which is undesirable in the final structure. For these reasons, the structural assembly to be brazed must be brought up to the brazing temperature for a short period and then down below the brazing temperature. If some of the structural components are of substantially thicker cross section than others, so that these thicker components heat up and cool down at a slower rate, while some of the components of substantially lesser cross section heat up and cool down quite rapidly, attempting to bond such dissimilar components into a composite structure becomes quite problematical.

Interrelated with these above problems are those that involve the use of honeycomb which has found wide application in the aerospace industry primarily because of the excellent strength to weight ratios obtained thereby. Most commonly in structural configurations, a honeycomb core or layer is bonded to upper and lower face sheets to form a structural panel. Mainly because of the various problems in bonding such as those listed above, the honeycomb panel or panels are joined to one another or to a heavier load carrying member by the use of doubler sheets or splice plates along with fasteners. To the best knowledge of the applicant herein, the practice of using solely bonding to form a composite structure made up of both honeycomb panel and heavier structural components has not become a widely used manufacturing technique in the aerospace industry.

In more recent years, the use of titanium for aerospace structures has been investigated more intensely, primarily because of its greater strength to weight ratio and its ability to withstand higher temperatures. However, some of the above-mentioned problem areas become more critical with titanium. For example, titanium is quite susceptible to embrittlement (e.g. by gases such as hydrogen and oxygen being dissolved into the titanium when it is exposed to higher temperatures).

However, titanium does offer one promising avenue in the joining of structural components in that it is capable of being diffusion bonded. While the precise mechanism of diffusion bonding is not completely understood, it has been described as bringing the surfaces of two components into contact with sufficient heat and pressure so that the atoms adjacent the adjoining surfaces move together to make atomically or molecularly mating surfaces which hold the components together as a unitary structure. Diffusion bonding is not possible with aluminum, since aluminum components are coated with a layer of aluminum oxide which remains on the surface to prevent diffusion bonding. However, with titanium, although there is a surface coating of titanium oxide, this titanium oxide dissolves into the titanium structure at the diffusion bonding temperature so that titanium atoms from the two bonding surfaces can come into intimate contact with one another to accomplish the diffusion bonding.

A solution to a particular problem in diffusion bonding is disclosed in U.S. Pat. No. 3,633,267, issued Jan. 11, 1972, one of the inventors of which is the applicant herein. This method discloses a method of diffusion bonding metallic honeycomb structure to a face sheet. A layer of honeycomb is placed in a furnace, with a face sheet spaced above the honeycomb core by means of heat yieldable spacers. Compressive force is applied to the upper face sheet through a yieldable medium (such as glass). Upon bringing the furnace up to diffusion bonding temperature, the heat yieldable spacers permit the sheet to come into contact with the honeycomb core, and the compressive force applied through the yieldable media insures that all portions of the face sheet are in proper diffusion bonding contact with the honeycomb.

With regard to the broader aspects of diffusion bonding, substantial background information of what is known in the prior art about the mechanisms involved in diffusion bonding is provided in two articles authored by W. H. King and W. A. Owczarski, the first article being entitled, "Diffusion Welding of Commercially Pure Titanium", appearing in the "Welding Journal Research Supplement", July, 1967, and the second article entitled, "Additional Studies on the Diffusion Welding of Titanium", appearing in the October, 1968 issue of the same magazine. (In both of these articles, the authors use the term "diffusion welding" in preference to the term "diffusion bonding" to describe this particular phenomenon.)

In the earlier article the authors describe diffusion welding (i.e. diffusion bonding) as follows:

"Diffusion welding is the process by which metals are joined by causing the coalescence of the mating surfaces through the application of pressure at elevated temperature; this is usually done in a protective atmosphere. The temperatures used are substantially below the melting point of the lowest melting base metal in the assembly but high enough to permit diffusional processes to occur. The applied pressure is sufficient to assure intimate interfacial contact, but it is not sufficient for macroscopic deformation of the parts."

In the experimental work described in this earlier article, pure titanium was used. The flat surfaces of two titanium pieces were pressed against one another (at pressures of 500 pounds per square inch and 1000 pounds per square inch) and these were subjected to temperatures between 1400° F. and 1600° F. In the latter part of this earlier article, under the title "General Discussion", the authors further describe the process as follows:

"The joining process is described in three stages, and the mechanisms which operate during the stages are considered. The initial stage involves the deformation of the contacting surface asperities to produce intimate contact in a large fraction of the interfacial area. Intimate contact is not completely achieved, and consequently voids remain in the interface which are of various sizes and shapes. During the second stage, diffusional processes become more significant than deformation, and many of the interfacial voids are eliminated by the diffusion of atoms to the void. Simultaneously, the interfacial grain boundary migrates out of the plane of the interface toward an equilibrium configuration which is nonplanar and indistinguishable from the other grain boundaries. Some of the voids are engulfed within the grains that cross the interface. After the migration of the interfacial grain boundary is essentially complete, the final stage of the process is the elimination of the voids within the grains."

In the later article, the authors discuss experimental results of the effects of pressure on the diffusion welding (bonding) process. Their experimental results indicated that it was necessary to apply pressure during the initial stage of the bonding process (presumably in the order of 500 to 1000 pounds per square inch), and that such pressure was not necessary for the second and third stage. In discussing the mechanism by which the voids are eliminated in the second and third stage, it is stated that it is by diffusion of the titanium into the voids. In the later part of this article, under the heading "Discussion of Results", the authors also discuss the possibility of whether the void elimination in the second and third stages may be due in part not only to diffusional processes, but also to a deformation process related to the "surface tension" due to the curvature of the void surface. However, after analyzing the manner in which such "surface tension" deformation should occur if it were an influence, the authors conclude that it is very doubtful that this mechanism of "surface tension" causing elimination of the voids actually does operate.

As a general comment on the state of the art of diffusion bonding, to the best knowledge of the applicant herein, diffusion bonding has not as yet achieved any great acceptance as a practical commercial process in fabricating titanium structure or the like. Particularly, it has been quite problematical to use diffusion bond in a structure where the components comprise fragile core (such as honeycomb) as well as more substantial load carrying members.

SUMMARY OF THE INVENTION

The present invention is a result of continuation of work related to that done in connection with the aforementioned U.S. Pat. No. 3,633,267, of which the applicant herein is one of the co-inventors. In that patent, there is disclosed a process for diffusion bonding a fragile core, such as a honeycomb core, to face sheets to make a honeycomb core panel. The particular problem toward which the subject matter of that patent is directed is that of initiating and maintaining a proper compressive force over the entire face sheet so that there is sufficient and uniform surface pressure between the face sheet and the edge portions of the honeycomb cells to accomplish diffusion bonding, without excessive force being applied in any particular area so that the fragile honeycomb core is not crushed.

As disclosed previously herein, this is accomplished in the method of that patent by placing a glass pad against each face sheet and applying a compressive force through the glass pad. The one or more glass pads are sufficiently soft at the diffusion bonding temperatures to apply an even compressive force over the entire face sheet. Also, glass spacer blocks are used to initially position one of the face sheets away from the honeycomb core, so that gas and other contamination can escape from the core cells prior to engagement of the face sheet with the honeycomb core. This assembly is placed in a furnace in a controlled atmosphere, and as it is brought up to the diffusion bonding temperatures, the glass spacer blocks yield to permit the face sheet to come into contact with the honeycomb core. Thereafter, diffusion bonding takes place to make a diffusion bonded honeycomb panel.

While the process described in the above-mentioned patent was found to work quite well in making a honeycomb panel, there still remains the problem of how to effectively join such a diffusion bonded honeycomb panel to load carrying structure. In structure such as that in a supersonic aircraft, it is extremely critical to obtain the highest strength to weight ratio possible. Diffusion bonding appears to have the greatest potential in this respect, since there is not the added weight of any braze or adhesive materials and the strength of the resulting bond approaches that of the base material. But on the basis of the prior art teachings relating to diffusion bonding, the difficulty with this approach is that the pressure required to diffusion bond two flat surfaces, as in bonding a face sheet to the surface of a load carrying edge member, far exceeds the pressure which the honeycomb core material will support without collapsing. However, it has been found that in accordance with the teachings of the present invention, it is possible to simultaneously diffusion bond delicate structure such as honeycomb core to a face sheet and also bond planar surfaces, such as two surfaces of load carrying members to each other or to a face sheet to form a composite structure including both honeycomb panel and other structure such as a load carrying member.

Heretofore, it has been believed that in order to diffusion bond two components at their respective flat surfaces, it is necessary to initially press the surfaces together at a pressure (in the order of 500 to 1000 pounds per square inch) great enough to cause sufficient deformation of very small surface irregularities so that there is actual surface contact at an atomic level over the majority of the adjoining surface area for the diffusion bonding to proceed to completion.

The lowest pressure used for diffusion bonding known to the applicant is in the order of 60 pounds per square inch. However, in accordance with the teachings of the present invention, it has been found that diffusion bonding can take place between two flat surfaces at very low initial contact pressures (in the order of one half pound per square inch). This is accomplished by forming a substantial vacuum at the surfaces at which diffusion bonding is to take place, and then heating these surfaces in said vacuum while maintaining the surfaces exposed to the vacuum. Thereafter, the surfaces are brought into contact with one another at the diffusion bonding temperatures and such contact is maintained with only very moderate pressure. At such pressure and temperature, the diffusion bonding proceeds to completion to form a strong and effective bond.

While the precise mechanism by which this bonding is accomplished in the present invention is not fully understood, the following can be hypothesized with some justification. In the prior art, diffusion bonding is usually undertaken with the bonding surfaces quite clean. However, even on these "clean" surfaces, there is very probably at least some small amount of surface contamination, for example in the form of water, or in the form of air or other gases adhering in molecular surface irregularities or perhaps absorbed into the titanium adjacent the surface, or as small amounts of oil or other organic matter adhering to or absorbed in the surface, etc. It is known that hydrogen is absorbed into titanium at about 300° F., nitrogen is absorbed into titanium at 500° F., and oxygen is absorbed into titanium at about 1300° F. At higher temperatures in a low pressure environment, water will break down to furnish oxygen and hydrogen. Carbon also is absorbed into titanium at some temperature higher than normal ambient temperature. Further, it is known that when such elements are absorbed into titanium, some embrittlement occurs in that these become interstitial solid solutions and then tend to stabilize the titanium crystals in the alpha phase, acting as barriers to the motion of dislocation of titanium atoms.

It can be further theorized that when two titanium surfaces according to the usual prior art process are pressed together at normal diffusion bonding pressures (e.g. 500 to 1000 pounds per square inch), some (perhaps most) of the surface contamination is trapped between the surfaces. As the temperature of the titanium is raised to the diffusion bonding temperatures (1500° to 1700° F.), there is probably some absorption of these contaminants into the titanium adjacent the bonding surfaces. Also, whatever contaminants were previously absorbed into the titanium adjacent the bonding surfaces probably remain entrapped in the titanium. Further, some portion of the contaminants may form small high pressure gas pockets which exert a back pressure that resists the filling of the voids with titanium. However, with the application of sufficient pressure, the resistance offered by such contaminants to deformation at the bonding surface is eventually overcome, and perhaps these contaminants finally become absorbed further into the structure so that the diffusion bonding can proceed to completion.

In the present invention, the planar surfaces that are to be diffusion bonded are exposed to a vacuum, and such exposure is maintained while the titanium is raised to near the diffusion bonding temperatures. This exposure is accomplished either by actually spacing the components from one another, or preassembling the components with very little contact pressure so that the normal surface irregularities give sufficient exposure of the surfaces to the vacuum environment. It is believed that during this exposure, nearly all the surface contamination is evaporated or "boiled" off the surface of the titanium, and whatever contaminants are absorbed into the titanium adjacent the surface are also pumped out of the titanium structure. It is believed this occurs between 1000° and 1500° F. When the titanium approaches the bonding temperatures, the titanium softens moderately and will more readily yield. Thus when the bonding surfaces are brought into contact with only moderate pressure at the bonding temperature, there is more intimate contact. The titanium adjacent the surface areas, being free of embrittling contamination, will more readily deform into atomically matching surfaces to form the diffusion bond.

As indicated previously, in the present invention this bonding takes place with a very low surface pressure at the bonding surfaces. It can further be theorized that the mechanism by which this diffusion bonding takes place is the "surface tension" phenomenon by which the titanium atoms surrounding any void tend to draw together and fill the void. As indicated previously herein in the discussion relating to the background of the present invention, in the aforementioned October, 1968 magazine article cited, this "surface tension" phenomenon was investigated, and it was concluded that it very probably was not a significant factor in accomplishing the diffusion bond. However, it is believed that the "surface tension" phenomenon is a significant factor in the diffusion bonding process of the present invention, quite possibly because of the effective removal of surface contaminants at the bonding surfaces permitting the titanium to deform into the voids.

However, regardless of the accuracy of the above hypothesis it has been found that the process of the present invention does effectively diffusion bond at planar surfaces with extremely low surface contact pressure, and is an effective manufacturing process for forming a diffusion bonded composite structure comprising fragile core structure and other structure (such as load carrying members) diffusion bonded at planar surfaces. While the present invention is directed primarily to titanium and diffusion bondable titanium alloys, the broader aspects of the present invention are intended to apply as well to nickel based alloys as well as other diffusion bondable materials.

In the preferred embodiments of the present invention, the glass tooling concept disclosed in the aforementioned patent, U.S. Pat. No. 3,633,267 is employed. The components are placed in a furnace with yieldable glass spacer blocks holding a top face sheet spaced above a honeycomb core, which in turn rests on a lower face sheet. In one embodiment a structural edge member is placed between the face sheets. In another embodiment, two outer portions of the two face sheets are brought into face to face planar contact to form an edge member. A vacuum is imposed upon this assembly, and the assembly is then heated to the diffusion bonding temperatures to bring the components into engagement for the diffusion bonding to take place. Glass pads are used where needed to transmit a uniform contact force to the members being bonded. Included within the invention are more specific applications of the process which are disclosed more particularly hereinafter.

DESCRIPTION OF THE PREFERRED EMBODIMENTS

Figure 1:
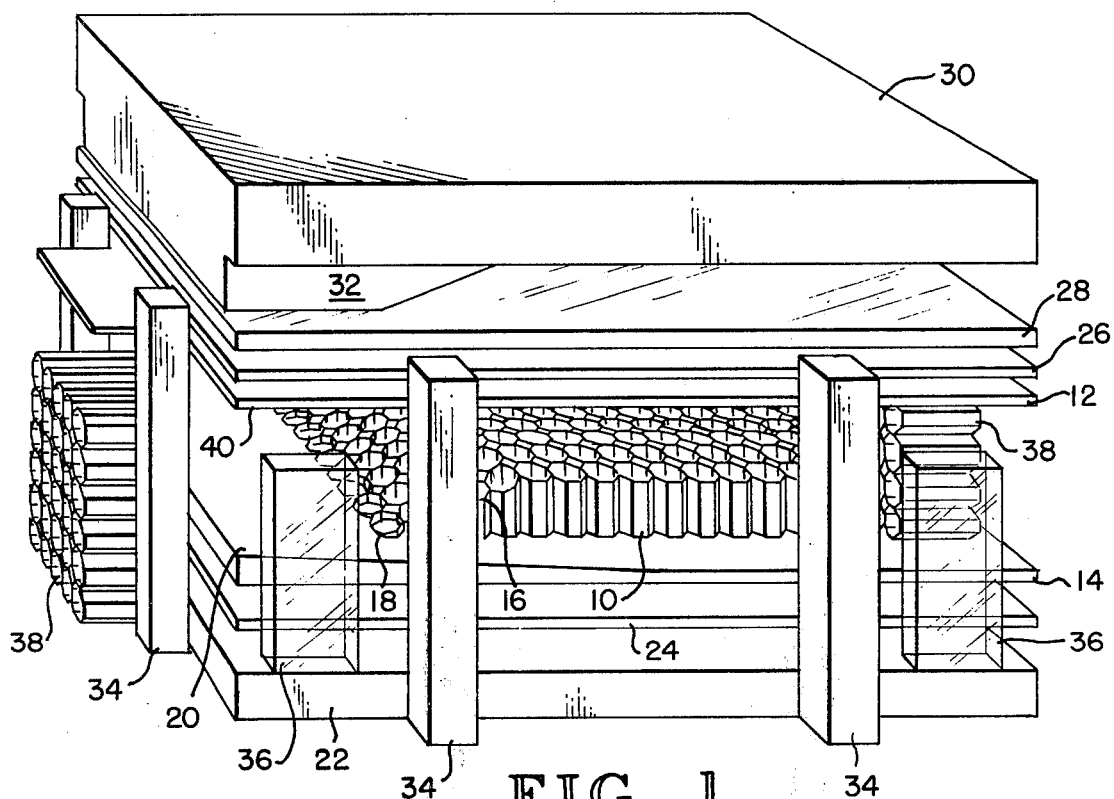
FIG. 1 is an isometric view of the manufacturing set up for practicing a first embodiment of the present invention.

With reference to FIG. 1, there is shown a manufacturing set up within a vacuum furnace for diffusion bonding a composite structure comprising a cellular core 10 (i.e. honeycomb), an upper face sheet 12 and a lower face sheet 14. The honeycomb core is moderately tapered, as at 16 at the left end (as seen in FIG. 1) down to a honeycomb edge 18. The left end 20 of the lower face sheet 14 is made moderately thicker to provide a load carrying edge portion of the composite structure to be made.

In this manufacturing set up of FIG. 1, there is a lower base plate 22 resting on the floor or base of the furnace (not shown). Above the base 22 is a titanium slip sheet 24, the upper surface of which bears against the lower face sheet 14, this slip sheet 24 preventing "dimpling" of the lower face sheet 14 into the honeycomb core 10. Above the upper face sheet 12 is a second slip sheet 26 and a glass pad 28 above the slip sheet 26. Positioned above the glass pad 28 is a metallic slab 30 which functions as a dead weight to apply pressure against the glass pad 28 through the slip sheet 26 to the upper face sheet 12 and so on down through the assembled components. The left end of the dead weight is formed with a trapezoidal like protrusion 32 to match the contour of the tapered honeycomb core 10.

A number of guide posts 34 are placed vertically around the periphery of the components 10 through 30 which comprise the stack-up shown in FIG. 1, to keep these components 10 through 30 in proper alignment with one another. Glass spacer blocks 36 are placed on the floor of the furnace and initially hold the dead weight 30 spaced moderately above the other components in the assembly. In the initial stack-up, one or more pieces of suitable support material, such as the honeycomb core 38 positioned with its cells horizontally aligned are used to hold the face sheet 12 with the slip sheet 26 and glass pad 28 moderately above the honeycomb 10. The glass pad 28, the slip sheets 24 and 26, as well as the non-bonding surfaces of the face sheets 12 and 14 are coated with boron nitride to prevent any chemical interaction of these components during the diffusion bonding process. For clarity of illustration, the various components 10 through 30 are shown spaced vertically from one another, it being understood that the only vertical spacing is provided by the blocks 36 and supports 38.

To accomplish the diffusion bonding, first a vacuum is drawn in the furnace down to a suitable level, approximately $10^{-5}$mm Hg. After the vacuum has been drawn, the furnace is heated up at a rate so that after about 60 minutes the furnace has reached a temperature of about 1500° F. At about 1500° F., the honeycomb support 38 has given away, so that the upper face sheet 12 and the other components positioned thereabove descend, and the glass spacer blocks 36 become initially soft so that the dead weight 30 also decends slowly, pushing against the glass pad 28, slip sheet 26 and upper face sheet 12 to bring the upper face sheet 12 into contact with the honeycomb core 10.

It will be noted that a portion 40 of the upper face sheet extends beyond the edge 18 of the honeycomb core 10 so as to be positioned above the thickened lower sheet portion 20. As the dead weight 30 descends very slowly, the trapezoidal portion 32 of the dead weight 30 presses this outer upper face sheet portion 40 into contact with the thickened lower sheet portion 20 so that there is surface contact of the planar or flat lower surface of the upper sheet portion 40 and the upper planar or flat surface of the lower sheet portion 20. This contact is under only very moderate pressure (e.g. one-half to one pound per square inch) by virtue of the dead weight 30 pressing through the glass pad 28 and slip sheet 26 against the upper sheet portion 40.

With the upper face sheet 12 in contact with both the honeycomb core 10 and the outer portion 20 of the lower face sheet 12, the temperature in the furnace continues to rise to a suitable level for diffusion bonding (e.g. 1600° to 1700° F.) and is held at that temperature for a suitable period (e.g. 2 to 6 hours). At the end of that diffusion bonding period, the furnace is cooled down to substantially ambient temperature (i.e. room temperature). The upper face sheet 12, lower face sheet 14 and honeycomb core 10 are, by the above process, diffusion bonded into the single composite structure 42 shown in FIG. 2. This composite structure 42 comprises a honeycomb panel portion 44 made up of the honeycomb core 10 diffusion bonded at its upper and lower face, which is made up of the honeycomb cell edge portions, to the upper and lower face sheets 12 and 14. Because the titanium face sheets will yield quite readily at the diffusion bonding temperature, the upper face sheet 12 readily changes its contour to fit closely against the contour of tapered portion 16 of the honeycomb and become bonded thereto.

Of particular significance in the present invention is that the two outer portions 20 and 40 of, respectively, the lower and upper face sheets 14 and 12 are diffusion bonded together along their entire contact surfaces to form an essentially unitary edge member 46. Thus in a single diffusion bonding operation, a composite structure is formed having a honeycomb panel portion 44 and a second structural portion 46 joined thereto.

As discussed previously herein, the reason that the diffusion bonding takes place between the planar surfaces of the sheet portions 20 and 40 is believed to be that the bonding surfaces are exposed to a vacuum at an elevated temperature for a period of time sufficient to remove substantially all surface contamination therefrom. Thus when the two bonding surfaces of the sheet portions 20 and 40 are brought together at approximately 1500° F., the titanium at the bonding surfaces more readily deforms into a diffusion bond. Observations of structures bonded according to the process of the present invention indicate that quite possibly pressure at the bonding surfaces is required only to the extent that contour irregularities are overcome so that all parts of the bonding surfaces are in contact.

Figure 2:
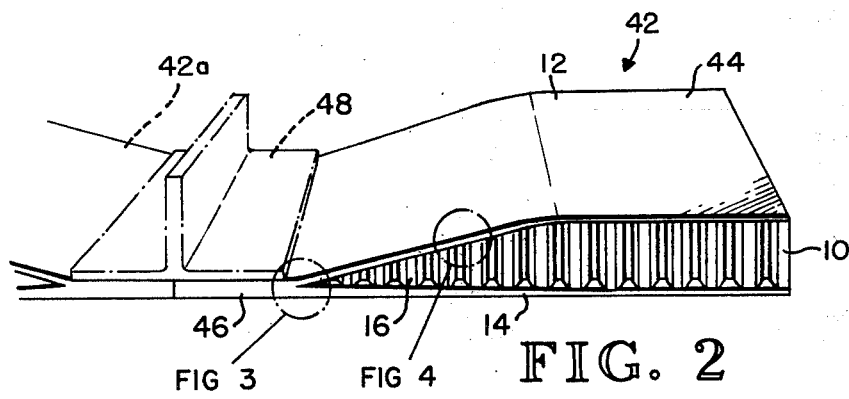
FIG. 2 is an isometric view of a composite structure made according to the process employing the apparatus of FIG. 1.
Figure 3:
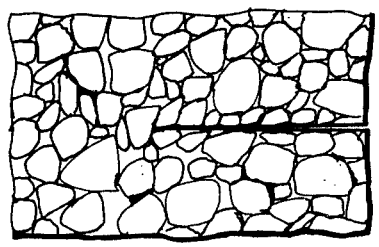
FIG. 3 is an enlarged sectional view detailing the structure circled at 3 in FIG. 2.
Figure 4:
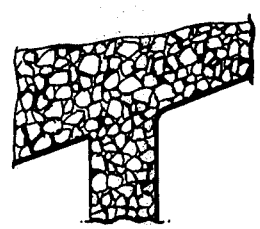
FIG. 4 is an enlarged sectional view illustrating the structure circled at 4 in FIG. 2.

FIG. 3 illustrates the nature of the grain structure in the area of the diffusion bond indicated at 3 in FIG. 2. FIG. 4 illustrates the nature of the titanium grain structure in the area of the bond indicated at 4 in FIG. 2. It can be seen that at both areas 3 and 4 the separate components have been diffusion bonded into an essentially unitary structure.

In FIGS. 5 through 10 are shown the sequential steps by which a composite structure is made, wherein a load carrying edge member of the structure is itself made of honeycomb.

Figure 5:
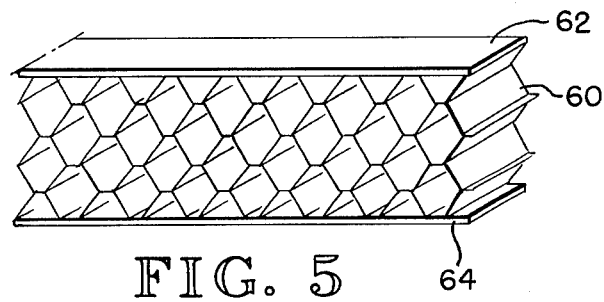
FIG. 5 is an isometric view showing an intermediate structure utilized in making an edge member according to a second embodiment of the present invention.

With reference to FIG. 5, a relatively dense honeycomb core 60 is spot welded to two side sheets 62 and 64, with the cellular structure of the honeycomb core 20 being parallel to the planes of the sheets 62 and 64. The assembly shown in FIG. 5 is then placed in a rectangular cavity 66 formed in a metallic tooling block 68. Upper and lower face sheets 70 and 72, respectively, are placed against, respectively, the upper and lower faces of the honeycomb core 60. A titanium slip sheet is placed below the lower sheet 72, and a glass pad 76 is placed on top of the upper face sheet 70. Glass blocks 78 hold a dead weight 80 moderately above the glass pad 76.

The bonding process is accomplished in substantially the same manner as described with reference to FIG. 1. First, a vacuum is drawn, and then heat is applied to cause the glass blocks to soften and permit the dead weight 80 to come into contact with the glass pad 76. The temperature in the furnace continues to rise, so that diffusion bonding takes place between the upper and lower face sheets 70 and 72 and the honeycomb core 60 and the two side sheets 62 and 64.

Figure 6:
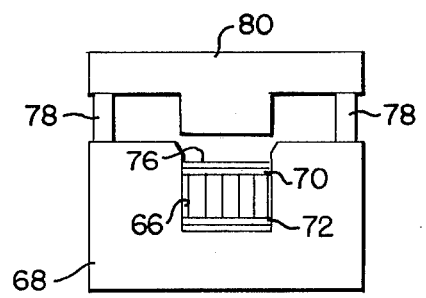
FIG. 6 is a semi-schematic sectional view illustrating the manner of applying face sheets to the structure of FIG. 5.
Figure 7:
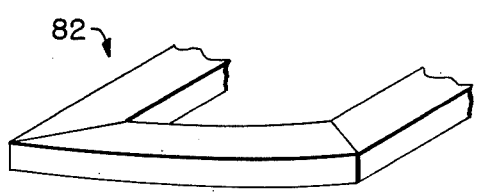
FIG. 7 is an isometric view showing the manner in which the edge members made according to FIG. 6 are joined to form an edge frame.
Figure 8:
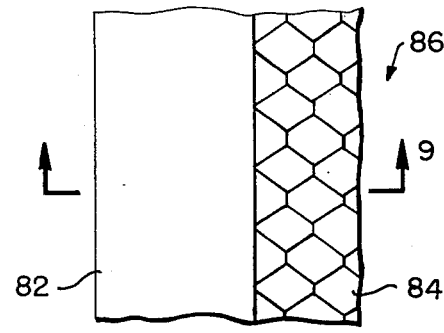
FIG. 8 is a top plan view illustrating a portion of a structure in which honeycomb structure is attached to the edge member shown in FIG. 7.
Figure 9:
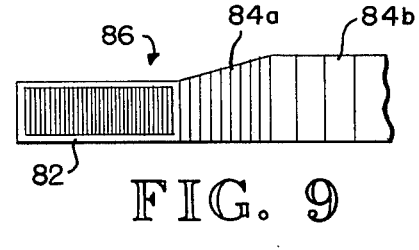
FIG. 9 is a sectional view taken along line 9—9 of FIG. 8.

Four such edge member assemblies are made as shown in FIG. 6, and these four assemblies are mitred and welded together to form a rectangular frame 82 as shown in FIG. 7. A second section of honeycomb 84 is then spot welded to the inside surface of the frame 82. This honeycomb section 84 may be of uniform density, or there may be a peripheral portion 84a of greater density and a central portion 84b of lesser density. In the particular structure shown herein, the honeycomb core 84 has a vertical or thickness dimension moderately greater than that of the edge frame 82, and accordingly, as shown in FIG. 9, the peripheral portion 84a of the honeycomb section 84 is machined at a moderate taper down to the level of the upper surface of the frame 82.

Figure 10:
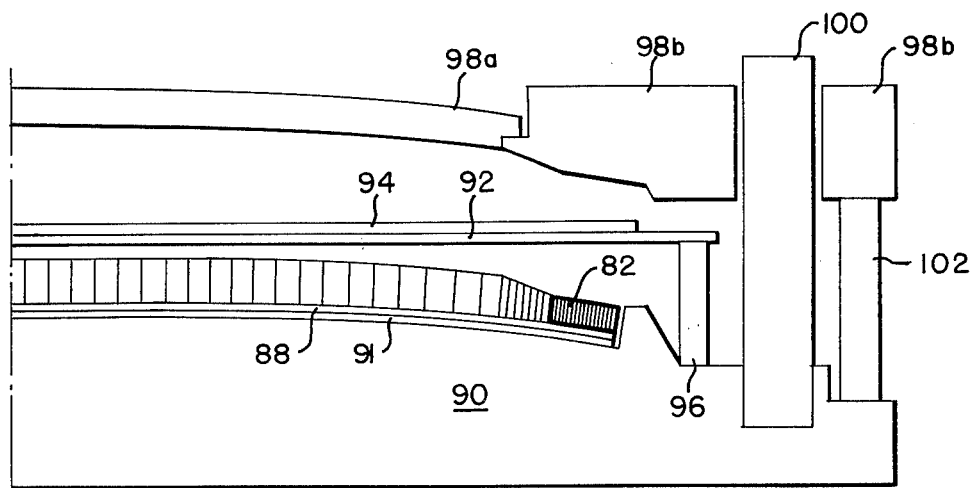
FIG. 10 is a side elevational view showing a manufacturing set up for making a composite structure utilizing the structural components illustrated in FIG. 9.

The final manufacturing step by which the end composite structure is made is shown in FIG. 10. The structure 86 shown in FIG. 9 is placed onto a lower face sheet 88 which in turn rests on a base 90, with a slip sheet 91 interposed. In this particular instance, the upper surface of the base 90 is moderately curved, the honeycomb structure 84 easily matching the contour of that curve. An upper face sheet 92 having a glass pad 94 thereabove is supported moderately above the structure 86 by means of glass blocks 96. Above the glass pad 94 is a dead weight made up of a center section 98a and a peripheral somewhat heavier section 98b. Suitable guide posts 100 are provided to guide the descent of the dead weight 98a–98b. Additional glass spacer blocks 102 are provided to support the dead weight 98a–98b.

The bonding process is accomplished substantially the same as described with reference to FIG. 1 previously herein. That is to say, the vacuum is drawn, the temperature raised, this eventually softening the blocks 96 and 102, to bring the component parts into moderate pressure contact, and the assembly is maintained at a suitable diffusion bonding temperature for a sufficient period of time to complete the diffusion bonding. Thereafter, the assembly is cooled down to form a finished structure in which the upper and lower face sheets 92 and 88 are bonding to both the upper and lower faces of the honeycomb core 84 and also to the upper and lower planar surfaces of the edge portion 82 of the structure.

In the initial manufacturing stack-up shown in FIG. 10, the lower surface of the edge member 82 rests against the lower face sheet 88 at very low contact pressure. As the vacuum is drawn, the normal surface deviations from a precise planar surface quite probably permit sufficient exposure of the contacting surfaces to the vacuum environment to permit evaporation of surface contamination prior to the more intimate contact achieved at the diffusion bonding temperatures when the titanium softens so that the contacting surfaces come into closer contacting relationship.

Figure 12:
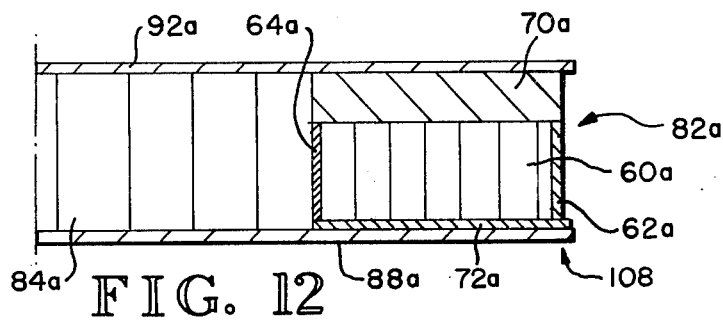
FIG. 12 is a sectional view showing the components which are diffusion bonded according to the present invention to form yet another structure.

A modification of the process illustrated in FIGS. 5 through 10 is shown in FIG. 12. Components shown in FIG. 12 which are similar to components shown in FIGS. 5 through 10 will be given like numerical designations with an a suffix distinguishing those of the structure of FIG. 12.

Thus there is an edge member comprising a honeycomb core 60a, two side sheets 62a and 64a, and upper and lower face sheets 70a and 72a. These five components are assembled into an edge frame, similar to the edge frame 82 shown in FIG. 7. The edge frame is in turn spot welded to a main central honeycomb section 84a, and upper and lower face sheets 92a and 88a, respectively, are bonded to the entire structure (i.e. the central core 84a and the edge frame 82a), generally as described previously herein, to form a composite structure 108.

For clarity of illustration, in FIG. 12 the various components making up the composite structure are illustrated as separate components. It will be noted that the upper face sheet 70a of the edge member 82a is made quite thick. In the final diffusion bonding step, the upper face sheet 92a becomes diffusion bonded to the member 70a so that these components are along with the other components in the structure essentially unitary. In other words, the component 70a and the portion of the sheet 92a bonded thereto is essentially one solid block or piece of titanium.

Figure 13:
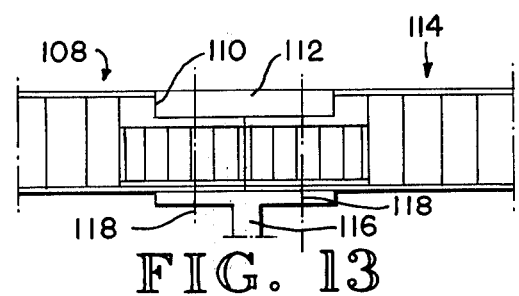
FIG. 13 is a sectional view illustrating the manner in which two of the sections made from the components shown in FIG. 12 are joined into a larger structure.

With reference to FIG. 13, in order to join the composite structure 108 shown in FIG. 12 to other structure, the block like portion of the structure 108 made up of the components 70a and adjoining portion of the face sheet 92a is machined to make a recess 110 to accommodate a splice plate 112 which is then flush with the top surface of the structure shown in FIG. 12. The composite structure can then in a known manner be joined to a second structure 114, the two structures 108 and 114 in turn being joined with the splice plate 112 to a T-beam 116 by means of fasteners, indicated schematically at 118 connecting the splice plate 112 structure edge portions 82a and 82b and the beam 116.

Figure 14:
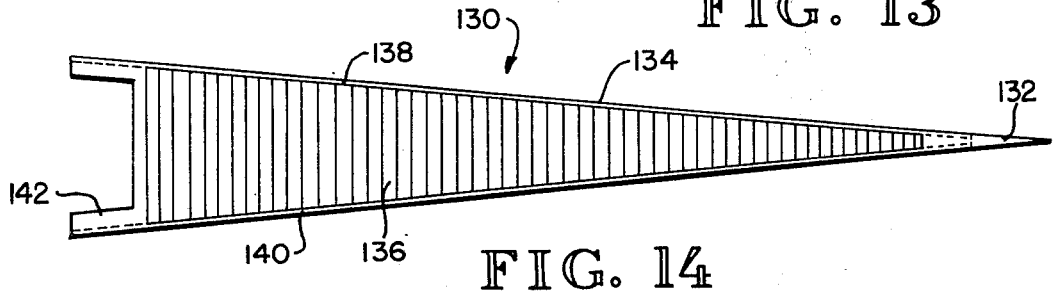
FIG. 14 is a composite structure made according to a further embodiment of the present invention.
Figure 15:
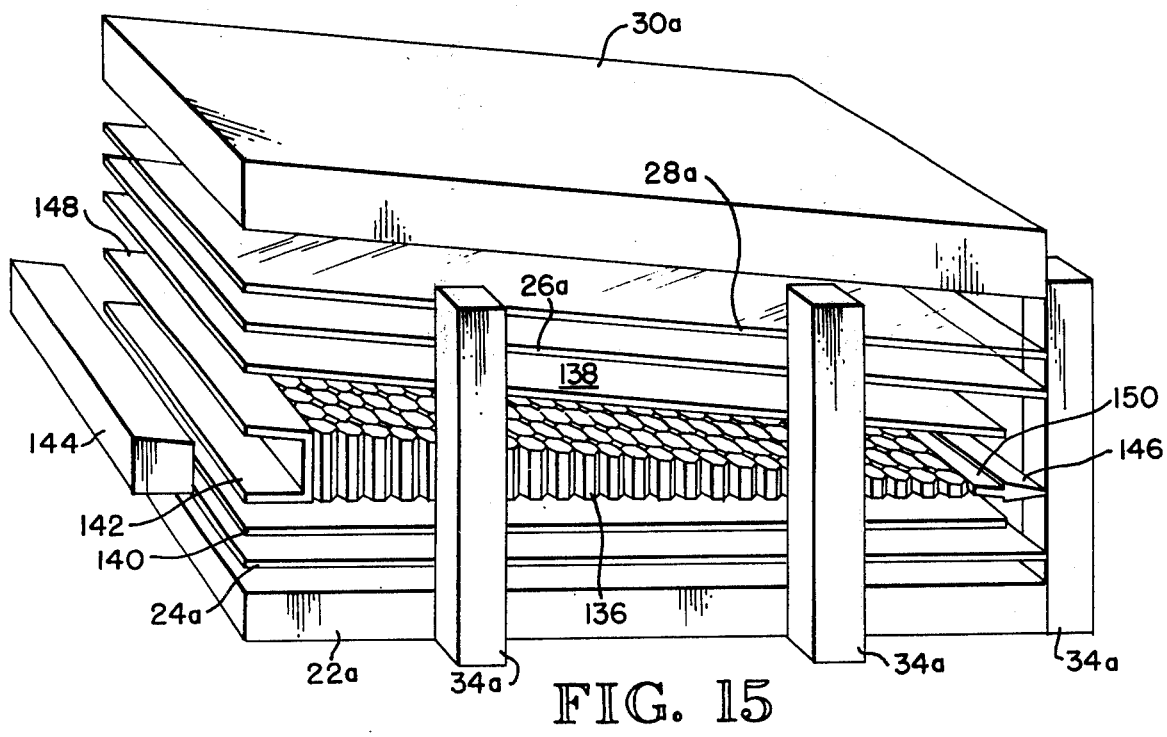
FIG. 15 is an isometric view of a manufacturing set up adapted to practice the process utilized in making the structure shown in FIG. 14.

In FIG. 14 there is shown yet another composite structure 130 made according to the process of the present invention and configured as a leading edge section of a supersonic aircraft. This structure 130 comprises a knife edge leading edge portion 132, a main honeycomb panel section 134 comprising a honeycomb core 136 and upper and lower face sheets 138 and 140, respectively, and a rear channel section 142 by which the structure 130 can be joined to other structure. The manufacturing set up for making the structure 130 is illustrated in FIG. 15 and is quite similar to that shown in FIG. 1. Hence, the tooling components in FIG. 15 corresponding to those in FIG. 1 will be given like numerical designations, with an *a* suffix distinguishing those shown in FIG. 15.

There is a lower base plate 22a, above which is a titanium slip sheet 24a, with the lower face sheet 140 being positioned directly above the slip sheet 24a. Proceeding upwardly, there is next the tapered honeycomb core section 136, the upper face sheet 138, above which are an upper slip sheet 26a, an upper glass pad 28a and a dead weight 30a having a planar lower surface. Guide posts 34a keep these components in proper vertical alignment and glass spacer blocks (not shown herein for convenience of illustration) position the upper face sheet 138 and the components thereabove moderately above the upper bonding face of the honeycomb core 136.

Spot welded to the rear of the honeycomb core 86 is a channel section 142. A support block 144 is positioned in the recess of this channel section 142 during the diffusion bonding process to support the channel section 142 which becomes more yielding at the diffusion bonding temperatures. Spot welded to the forward portion of the honeycomb is an "arrowhead" section 146 which forms the forward "knife edge" of the structure 130. The bonding process is substantially the same as that described with reference to the manufacturing set up shown in FIG. 1. (For convenience of illustration the heat yieldable support means, such as the glass blocks 36 and honeycomb support 38, are not shown in FIG. 15.) In this process, first a vacuum is drawn, and the temperature in the furnace is raised until the glass blocks yield to permit the upper face sheet and the components thereabove to descend, with the upper face sheet 138 coming into contact with the upper face of the honeycomb core 136 and also into contact with the upper planar surface 148 of the channel 142 and an upper planar surface 150 of the forward "arrowhead" component. The lower face sheet 140 is in similar engagement with the honeycomb core 136 and the components 142 and 146. The temperature in the furnace continues to rise to the diffusion bonding temperature (e.g. 1600° to 1700° F.) for a suitable period (e.g. 2 to 6 hours). At the end of this period, the temperature in the furnace is lowered to a suitable temperature (e.g. 70° F.) and the result is the composite structure shown in FIG. 14. For purposes of illustration, in FIG. 14 there is shown in dotted lines the diffusion bonding surfaces at which the material joins to one another to form an essentially unitary structure.

Figure 11:
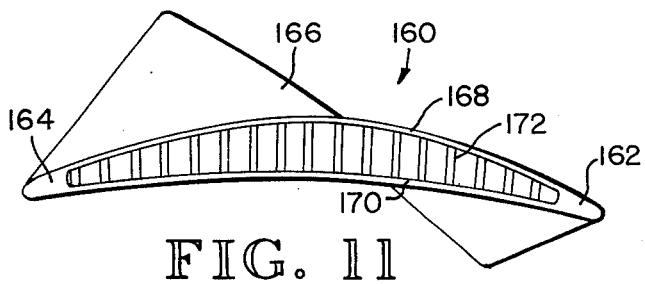
FIG. 11 illustrates yet another structure made according to the process of the present invention.

In FIG. 11 there is shown another composite structure that can be made according to the process of the present invention, this structure being a section 160 of a turbine blade, comprising a leading edge 162, a trailing edge 164 and a middle section 166. The middle section 166 is made up of upper and lower face sheets 168 and 170, respectively, between which is sandwiched a honeycomb core 172. It will be noted that the contour of the turbine blade is such that there is an axial "twist" or "warp" along the axis of the blade to give it its proper aerodynamic characteristics.

The structure 160 shown in FIG. 11 can readily be manufactured according to the process of the present invention since at the diffusion bonding temperatures, the face sheets 168 and 170 will readily yield or deform to fit the curved or "warped" contour of the blade 160. Thus, in the manufacturing stack-up, the lower base member of the manufacturing stack-up is shaped to match the desired end contour of the lower face sheet 170, and the upper dead weight is shaped to match the desired end contour of the upper face sheet 168. The honeycomb core 172, even at room temperature, will readily conform to fit a curved contour. Thus, in the present invention, not only is it possible to diffusion bond planar composite structures comprising honeycomb panel and load carrying members, but also to form such structures which curve substantially from a planar configuration. Suitable load carrying components are bonded to the upper and lower face sheets 168 and 170 to form the leading and trailing edge portions 162 and 164.

EXAMPLE I.

A manufacturing stack-up was made substantially as shown in FIG. 1. The honeycomb core was 6 × 6 × 0.50 inch high 4–17 C.P. titanium honeycomb core, and was prepared by stablizing the core in Rigidex machining compound and machining with a single point flying cutter. One end of the core was machined with a 15° taper. The dead weight tool was machined to mate with the contour of the core. The face sheets for this panel were 0.032 inch thick Ti—6Al—4V sheets of uniform thickness.

One glass pad of 0.125 pyrex was used on top of the panel to form the face sheet to the configuration of the core and provide the fluid pressure to accomplish bonding. A titanium slip sheet was used between the glass pad and the upper face sheet to prevent dimpling of the thin face sheet into the honeycomb core cells. The glass pad, slip sheet and non-bonding sheet surfaces were coated with boron nitride to prevent interreaction. A vacuum was drawn and this assembly was heated at about 1500° F., the upper face sheet and the dead weight descended onto the honeycomb core and the lower face sheet. The temperature continued to be raised until it reached 1700° F., and the 1700° F. temperature was maintained for four hours. Metallographic analysis of the bonds between the face sheet and the core and between the two bonding surfaces of the upper and lower face sheets revealed no noticeable voids. The bonding surfaces were essentially as shown in FIGS. 3 and 4, and the structure was substantially as shown in FIG. 2. The pressure exerted on the upper face sheet during the diffusion bonding process was approximately ½ pound per square inch.

EXAMPLE II.

In this example, a composite structure was made substantially as shown in FIG. 12. An edge member was made by spot welding one inch wide strips of 4–30, C.P. core 0.50 inches high to vertical strips of Ti—6Al—4V, 0.032 inch thick. The structure was then immobilized in Rigidex and machined flat. The horizontal strips on the edge member were bonded in a dead weight tool using a glass pad wrapped in 0.001 inch thick tantalum foil. The bonded edge member was then spot welded to a 4–17 C.P. titanium 0.0750 inch thick honeycomb blanket and machined in Rigidex with sculpturing of the honeycomb. This structure was then bonded to upper and lower face sheets in substantially the same manner as indicated in Example I (i.e. the temperature raised to 1500° F. in the vacuum until the upper face sheet and dead weight descended onto the honeycomb and edge member, and then diffusion bonded in a vacuum at 1700° F. for 4 hours). The solid thickened portion of the edge member (corresponding to component 70a in FIG. 12) was 0.25 inches thick. A recess was machined in this 0.25 inch thick solid portion to accommodate a doubler.

EXAMPLE III.

A manufacturing stack-up was made substantially as shown in FIG. 15. A 1.50 inch high Ti—3Al—2.5V honeycomb core was spot welded to an edge member, then stabilized in Rigidex, and machined on both sides to a 7° taper. An arrowhead section was machined from Ti—6Al—4V with 0.032 inch steps to accommodate the face sheets and then spot welded to the thin edge of the tapered honeycomb core. A vacuum was drawn and heat was applied. At 1500° F. the upper face sheet descended into its contact position. The bonding of two Ti—6Al—4V face sheets was done on a horizontal flat base with one glass pad on top at a temperature of 1700° F. for four hours. A unitary diffusion bonded structure, as shown in FIG. 14, was the result.

I claim:

1. A method of making a diffusion bonded composite metallic structure of a material selected from a group consisting of titanium and titanium based alloys, comprising a panel portion having a relatively fragile cellular core and a load carrying portion connected to said panel portion, said method comprising:
    a. providing a cellular core component having a plurality of cellular core elements and having at least one bonding face made up of said cellular core elements,
    b. providing at least one face sheet component having a substantially planar bonding surface,
    c. providing a load carrying component having at least one planar bonding surface,
    d. forming a substantial vacuum at said bonding face and said bonding surfaces,
    e. heating said bonding face and said bonding surfaces at a temperature sufficient and for a time period sufficient to remove substantial surface contamination therefrom, while maintaining said bonding surfaces and bonding face sufficiently exposed to permit escape of contamination from said bonding surfaces and said face as gases, so as to make said surfaces and said face substantially uncontaminated,
    f. bringing the components to a bonding temperature and urging the bonding surface of said face sheet into contact with the bonding face of said core component and said bonding surface of said load carrying component in a desired configuration by pressing a compliant medium against the opposed surface of said face sheet, the resulting contact pressure of the surface of said sheet against the surface of the load carrying component being no more than 10 pounds per square inch and the contact pressure of said sheet against said bonding face being less than a pressure level which would cause significant deformation of said cellular core component, and with sufficient heat and pressure and for a sufficient period of time to simultaneously cause diffusion bonding of said components to make said composite structure.

2. The method as described in claim 1, wherein said core component comprises honeycomb core, and said load carrying component comprises a load carrying edge member.

3. The method as described in claim 2, further comprising initially attaching said edge member to said honeycomb core and then bringing said diffusion bonding surfaces and diffusion bonding face into diffusion bonding engagement.

4. The method as described in claim 2, wherein said face sheet is spaced from said edge member during step (e).

5. The method as recited in claim 2, wherein said face sheet is in contact with said edge member during step (e), but with sufficiently moderate pressure so that planar deviations from said surfaces cause substantial area of noncontact so as to provide sufficient surface exposure to permit escape of contamination as gases.

6. The method as recited in claim 2, wherein said load carrying edge member has at least one thicker portion which becomes diffusion bonded to said face sheet to form a substantially unitary thickened portion, and further comprising removing a portion of said unitary thickened portion to provide a structure receiving recess.

7. The method as recited in claim 2, wherein said edge member comprises edge member honeycomb core sandwiched between edge member face sheets, and said face sheet component is diffusion bonded to said edge member face sheet.

8. The process as recited in claim 2, wherein said honeycomb and said edge member are placed on said face sheet, and a second face sheet is spaced above said honeycomb core and said edge member, said second face sheet being brought into bonding contact with said honeycomb core and said edge member after forming said vacuum and heating said bonding face and said bonding surfaces, to form a composite structure comprising a honeycomb panel and a structural edge member.

9. A method of making a diffusion bonded composite metallic structure of material selected from a group consisting of titanium and titanium based alloys, comprising a panel portion having a relatively fragile cellular core and an edge portion connected to said panel portion, said method comprising:
   a. providing a cellular core component having a plurality of cellular core elements and having two opposed bonding faces made up of said cellular core elements,
   b. providing two face sheet components, each having a substantially planar bonding surface,
   c. forming a substantial vacuum at said bonding faces and said bonding surfaces,
   d. heating said bonding faces and said bonding surfaces at a temperature sufficient and for a time period sufficient to remove substantial surface contamination therefrom, while maintaining said bonding surfaces and bonding faces sufficiently exposed to permit escape of contamination from said bonding surfaces and said faces as gases, so as to make said surfaces and said faces substantially uncontaminated, and
   e. bringing the bonding surfaces of said face sheets into contact with respective bonding faces of said core component, and further bringing portions of the bonding surfaces of said face sheets into surface contact with one another, at a contact pressure of no more than 10 pounds per square inch said steps of bringing being accomplished by urging a compliant medium against the opposed surface of one of said face sheets at less than a pressure level which would cause significant deformation of said cellular core component, and with sufficient heat and pressure and for a sufficient period of time to cause diffusion bonding of said face sheets to said core, and also to simultaneously cause diffusion bonding of said face sheets to each other to form the edge portion of said structure.

* * * * *